(12) United States Patent
Choi et al.

(10) Patent No.: US 10,408,255 B2
(45) Date of Patent: Sep. 10, 2019

(54) VARIABLE COMPRESSION RATIO APPARATUS

(71) Applicant: HYUNDAI MOTOR COMPANY, Seoul (KR)

(72) Inventors: Myungsik Choi, Seoul (KR); Won Gyu Kim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 187 days.

(21) Appl. No.: 15/258,003

(22) Filed: Sep. 7, 2016

(65) Prior Publication Data

US 2017/0268562 A1   Sep. 21, 2017

(30) Foreign Application Priority Data

Mar. 15, 2016 (KR) .................. 10-2016-0031084

(51) Int. Cl.
   *F02B 75/04* (2006.01)
   *F15B 15/14* (2006.01)
   *F16C 7/06* (2006.01)
   *F15B 11/12* (2006.01)

(52) U.S. Cl.
   CPC ............. *F16C 7/06* (2013.01); *F02B 75/045* (2013.01); *F15B 15/1409* (2013.01); *F15B 15/149* (2013.01); *F15B 11/123* (2013.01)

(58) Field of Classification Search
   CPC ....... F16C 7/06; F02B 75/045; F15B 15/1409
   USPC .......................... 92/60.5; 91/178; 123/78 E
   See application file for complete search history.

(56) References Cited

U.S. PATENT DOCUMENTS

| 4,195,601 A | 4/1980 | Crise | |
| 8,746,188 B2 * | 6/2014 | Wilkins | ............... F02B 75/044 123/48 A |

FOREIGN PATENT DOCUMENTS

| JP | 2006-105095 A | 4/2006 |
| JP | 2009-36128 A | 2/2009 |
| KR | 10-2010-0062721 A | 6/2010 |
| KR | 10-0980863 B1 | 9/2010 |
| KR | 10-1500386 B1 | 3/2015 |

* cited by examiner

*Primary Examiner* — Michael Leslie
*Assistant Examiner* — Daniel S Collins
(74) *Attorney, Agent, or Firm* — Brinks Gilson & Lione

(57) ABSTRACT

A variable compression ratio apparatus may include: a connecting rod having an end connected with a crank pin of a crank shaft; a plunger housing formed at the other end of the connecting rod, the plunger housing having a space to which a plunger is inserted. In particular, the plunger moves upwardly and downwardly, and an outer circumference surface of the plunger contacts an inner circumference surface of the plunger housing. The apparatus further includes a protrusion protruded from the plunger to the plunger housing and connected with a piston, and a hydraulic pressure control valve for supplying hydraulic pressure to the space and moving the plunger by supplying hydraulic pressure.

13 Claims, 6 Drawing Sheets

FIRST HIGH COMPRESSION RATIO

FIRST HIGH COMPRESSION RATIO

SECOND HIGH COMPRESSION RATIO

MIDDLE COMPRESSION RATIO

LOW COMPRESSION RATIO

FIG. 6

| OIL LINE | HIGH COMPRESSION RATIO | | MIDDLE COMPRESSION RATIO | LOW COMPRESSION RATIO |
| --- | --- | --- | --- | --- |
| | 1 | 2 | | |
| ① | X | X | O | O |
| ② | O | O | X | X |
| ③ | X | O | O | X |

VARIABLE COMPRESSION RATIO APPARATUS

CROSS-REFERENCE TO RELATED APPLICATION

This application claims priority to and the benefit of Korean Patent Application No. 10-2016-0031084, filed on Mar. 15, 2016, the entire contents of which are incorporated herein by reference.

FIELD

The present disclosure relates to an internal combustion engine. More particularly, the present disclosure relates to a variable compression ratio apparatus to improve fuel efficiency.

BACKGROUND

The statements in this section merely provide background information related to the present disclosure and may not constitute prior art.

Generally, thermal efficiency of combustion engines increases as the compression ratio increases, and if ignition timing is advanced to some degree, thermal efficiency of spark-ignition engines increases.

However, if the ignition timing of the spark-ignition engines is advanced at a high compression ratio, abnormal combustion may occur and the engine may be damaged. Thus, the ignition timing cannot be excessively advanced and accordingly engine output may deteriorate.

A variable compression ratio (VCR) apparatus changes the compression ratio of an air-fuel mixture according to a driving condition of the engine.

The variable compression ratio apparatus raises the compression ratio of the air-fuel mixture at a low-load condition of the engine in order to improve fuel mileage. On the contrary, the variable compression ratio apparatus lowers the compression ratio of the air-fuel mixture at a high-load condition of the engine in order to inhibit or prevent occurrence of knocking and improve engine output.

Currently, for diesel engines, in order to meet the tight control of exhaust gas, low temperature combustion is implemented by decreasing a compression ratio by increasing the volume of a piston combustion chamber. Since cold engine start performance is deteriorated according to the decrease of compression ratio, the stiffness of a glow system is strengthened by making it with ceramic material and a separate system for controlling the glow system is added. Consequently, a manufacture cost is increased.

The description in the Background is written to increase understanding of the background of the present disclosure, and it may include descriptions which are not the conventional art that is already known to a person of ordinary skill in the art.

SUMMARY

The present disclosure provides a variable compression ratio apparatus which may decrease fuel consumption and improve engine power by changing compression ratio in multistep according to an operation condition of the engine.

In one form, the variable compression ratio apparatus may include: a connecting rod having an end connected with a crank pin of a crank shaft; and a plunger housing formed at the other end of the connecting rod, the plunger housing having a space to which a plunger is inserted therein, and the space is opened in opposite direction of the crank pin. In particular, the plunger is disposed to move back and forth, e.g. upward and downward (although other orientations may be used based on the angle and orientation of the piston), and an outer circumference surface of the plunger contacts an inner circumference surface of the plunger housing. The variable ratio apparatus further includes: a protrusion protruded outwardly from the plunger to the plunger housing, and connected with a piston through a piston pin; and a hydraulic pressure control valve for supplying hydraulic pressure to the space, and disposed to move the plunger by supplying the hydraulic pressure to a rear surface that corresponds to the crank pin and to a front surface that corresponds to the piston pin from the plunger.

The plunger may include a second plunger disposed inside the space, and a first plunger disposed at a side of the piston independent of the second plunger, and has a small diameter than a diameter of the second plunger.

The hydraulic pressure control valve may supply hydraulic pressure between the second plunger and the first plunger.

The connecting rod may include, in its inside, a first path providing hydraulic pressure from the hydraulic pressure control valve to the front surface of the first plunger, a second path providing hydraulic pressure from the hydraulic pressure control valve to the rear surface of the second plunger, and a third path providing hydraulic pressure from the hydraulic pressure control valve to a portion between the first plunger and the second plunger.

The space of the plunger housing includes a large inner diameter portion where the second plunger may be disposed, and a small inner diameter portion where the first plunger may be disposed, and in particular, a stopping protrusion may be formed between the large inner diameter portion and the small inner diameter portion, so as to stop a movement of the second plunger.

The hydraulic pressure supplied by the hydraulic pressure control valve may be supplied to an inside space of the plunger housing through the crank shaft, the crank pin and the connecting rod.

The hydraulic pressure control valve may supply oil only to the second path so as to supply the hydraulic pressure between the first plunger and the second plunger, thereby high compression ratio being implemented by putting a distance between the first plunger and the crank pin.

The hydraulic pressure control valve may supply oil to the second path and the third path such that hydraulic pressure is supplied between the second plunger and the first plunger, and to a rear surface of the second plunger opposite to the first plunger, and the first plunger becomes apart from the crank pin, thereby implementing a high compression ratio.

The hydraulic pressure control valve may supply oil only to the first path such that hydraulic pressure is supplied to a front surface of the first plunger, and the first plunger becomes close to the crank pin, thereby implementing a low compression ratio.

The hydraulic pressure control valve may supply oil to the first path and the third path such that hydraulic pressure is supplied to a rear surface of the second plunger opposite to the first plunger, and to a front surface of the first plunger, and the first plunger is moved downward, and a middle compression ratio may be implemented in a state in which the first plunger is supported by the second plunger.

A variable compression ratio apparatus according to the present disclosure may include a connecting rod having an end connected with a crank pin of a crank shaft, a plunger housing formed at the other end of the connecting rod, the plunger housing having a space to which a plunger is inserted therein, wherein the space is opened in opposite direction to the crank pin, a first plunger disposed at an opposite side of the crank pin in the space, a second plunger disposed at an inside of the first plunger in the space, a protrusion protruded outwardly from the first plunger to the plunger housing, and connected with a piston through a piston pin, and a hydraulic pressure control valve disposed to move the first and second plungers by supplying the hydraulic pressure to a rear surface of the second plunger and to a front surface of the first plunger.

The hydraulic pressure control valve may supply hydraulic pressure between the second plunger and the first plunger.

The connecting rod may include, in its inside, a first path providing hydraulic pressure from the hydraulic pressure control valve to the front surface of the first plunger, a second path providing hydraulic pressure from the hydraulic pressure control valve to the rear surface of the second plunger, and a third path providing hydraulic pressure from the hydraulic pressure control valve to a portion between the first plunger and the second plunger.

The space of the plunger housing includes a large inner diameter portion where the second plunger may be disposed, and a small inner diameter portion where the first plunger may be disposed. In one form, a stopping protrusion may be formed between the large inner diameter portion and the small inner diameter portion, so as to stop a movement of the second plunger.

According to the present disclosure, the high compression ratio, the middle compression ratio and the low compression ratio may be easily performed by controlling the hydraulic pressure supplied to the first, second and third paths through the hydraulic pressure control valve, and by controlling the position of each of the first plunger and the second plunger.

Particularly, by controlling the compression ratio in multistep, the fuel consumption is decreased and the engine power is improved in comparison with the conventional variable compression ratio apparatus of two steps.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
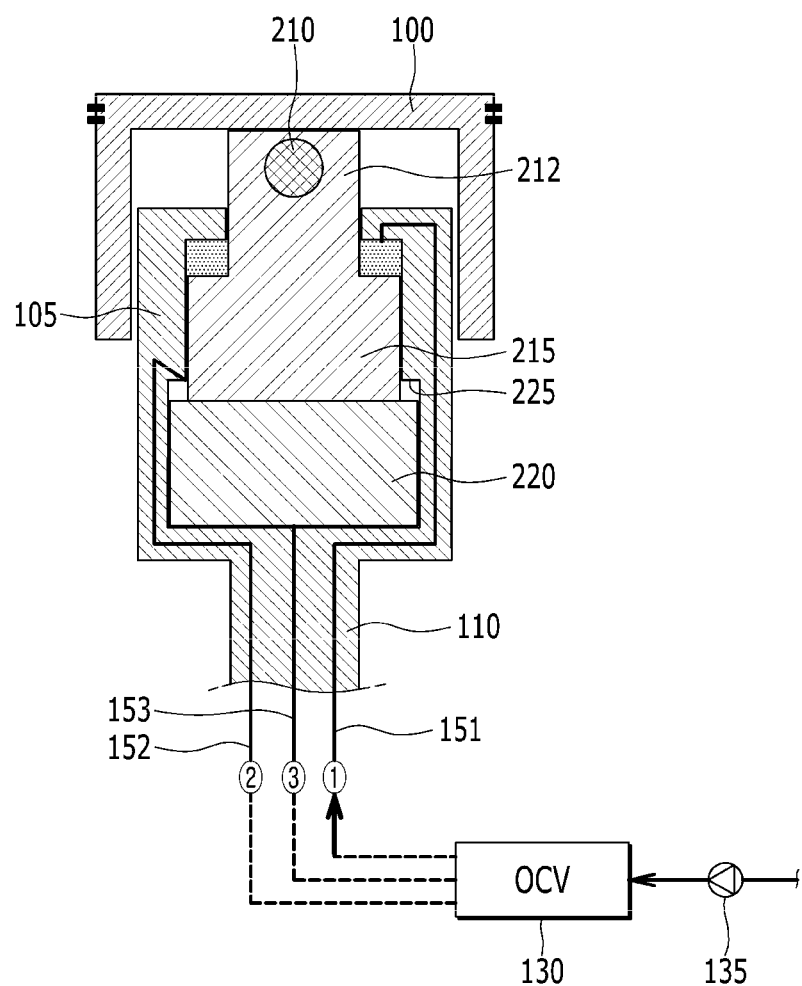

FIG. 5 is a partial cross-sectional view illustrating the state in which hydraulic pressure is supplied to the first path in a variable compression ratio apparatus according to the present disclosure; and FIG. 6 is a table representing a hydraulic pressure supply state of an oil line according to the high compression ratio, the middle compression ratio and the low compression ratio in a variable compression ratio apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

However, since the size and the thickness of each element shown in the drawings are represented in arbitrary scale for the convenience of description, the present disclosure is not limited thereto, and the thickness is enlarged in order to clearly represent several parts and regions.

Further, in order to clearly describe the exemplary forms of the present disclosure, the part that is not in relation to the description is omitted.

The term "first", "second", or the like is used for distinguishing elements that have the same title, but the titles are not limited to the order.

Figure 1:
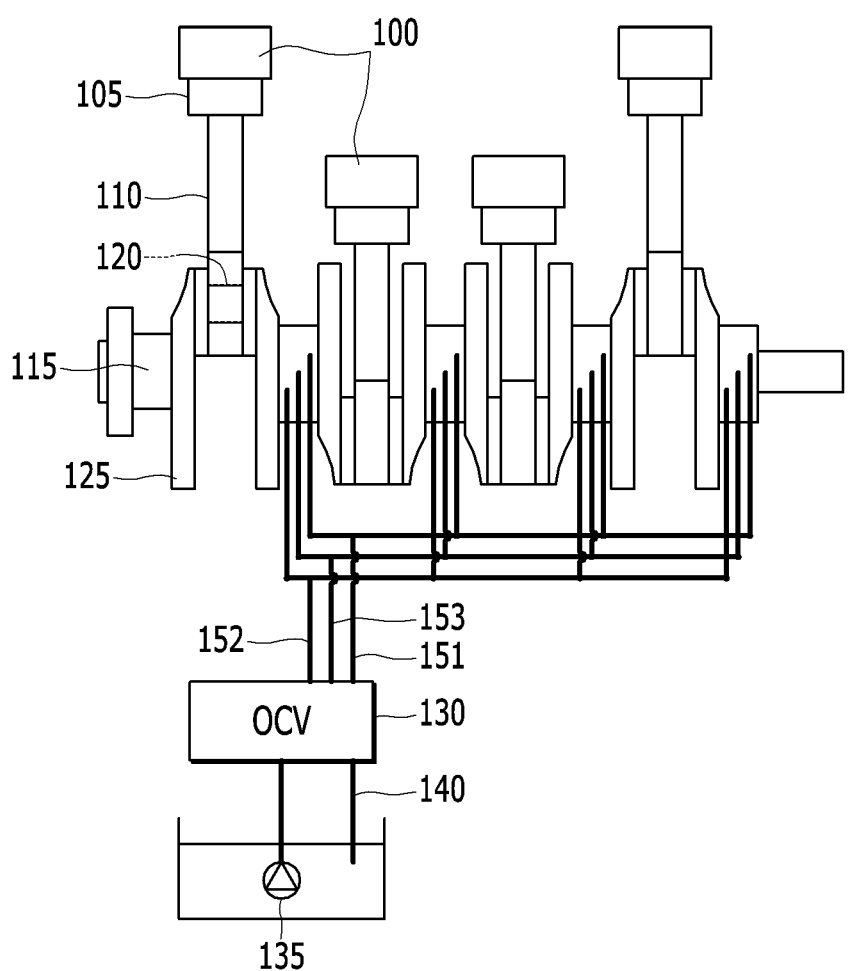
FIG. 1 is schematic diagram illustrating a variable compression ratio apparatus according to one form of the present disclosure.

Referring to FIG. 1, a variable compress ratio apparatus includes: a piston 100, a plunger housing 105, a connecting rod 110, a crank pin 120, a crank shaft 115, a balance weight 125, a hydraulic pressure control valve 130, a first path 151, a second path 152, a third path 153, an oil pump 135, and return path 140.

The oil pump 135 pumps oil to the hydraulic pressure control valve 130, and the hydraulic pressure control valve 130 controls the respective oil pumped to the first path 151, the second 152 and the third path 153 according to an operation condition.

The first path 151, the second 152 and the third path 153 are provided from the hydraulic pressure control valve 130 to the inside of plunger housing 105 through the crank shaft 115, the crank pin 120 and the connecting rod 110, respectively. And, the compression ratio is varied by the plunger housing 105 that controls the piston 100 of the volume being lifted up, which is made by the hydraulic pressure provided to the plunger 105.

Figure 2:
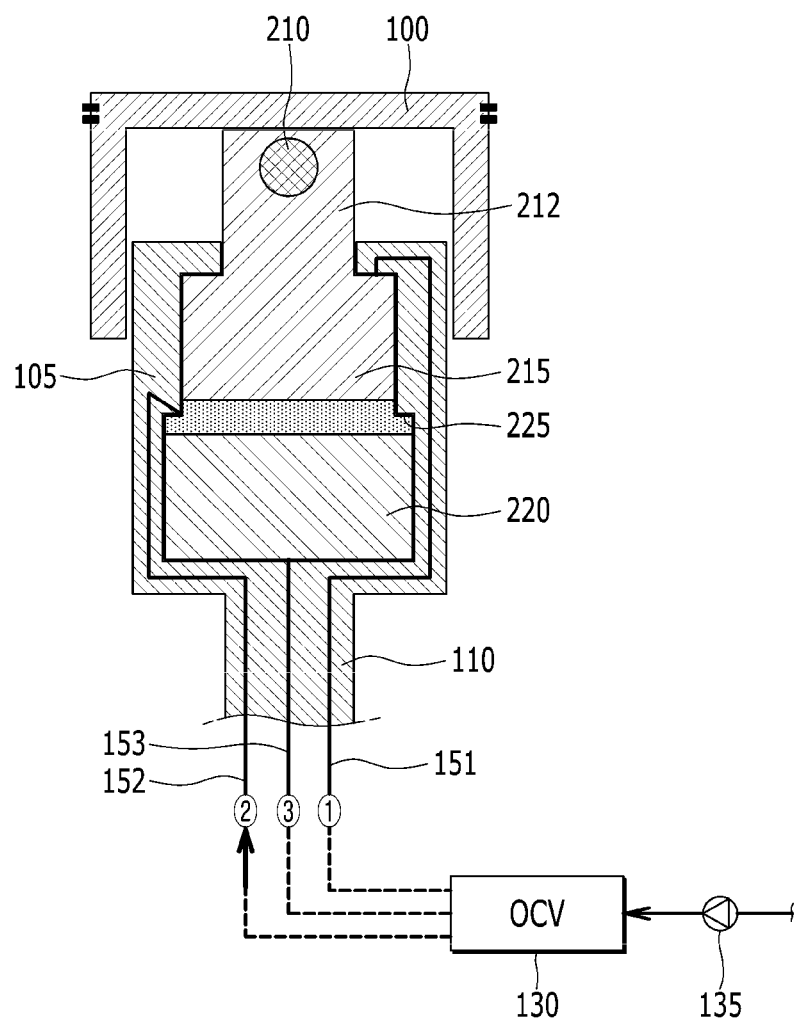
FIG. 2 is a partial cross-sectional view illustrating the state that hydraulic pressure is supplied to the second path in a variable compression ratio apparatus according to one form of the present disclosure.

The cross-sectional structure of the plunger housing 105 will be described in more detail with referring to FIG. 2. FIG. 2 is a partial cross-sectional view illustrating the state that hydraulic pressure is supplied to the second path in a variable compression ratio apparatus.

Referring to FIG. 2, a lower portion of the plunger housing 105 is connected with the connecting rod 110. And the plunger housing 105 forms an open space of which a center portion is toward an upper portion. A second plunger 220 is disposed with being inserted to the lower portion of the open space, and a first plunger 215 is disposed with being inserted to the upper portion of the open space.

The side surfaces of the second plunger 220 and the first plunger 215 contact an inner circumference surface of the plunger housing 105, and the second plunger 220 has an outer diameter that is longer than an outer diameter of the first plunger 215. A stopping protrusion 225 is formed between the lower portion of the open space where the second plunger 220 is disposed and the upper portion of the open space where the first plunger 215 is disposed.

In addition, at the center portion of the upper surface of the first plunger 215, a protrusion 212 is protruded upwardly, and the protrusion 212 is connected with the piston 100 through a piston pin 210.

And, the compressive force or the expansion energy exerted to the piston 100 is delivered to the crank shaft 115 through the first plunger 215, the second plunger 220, the plunger housing 105, the connecting rod 110 and the crank pin 120, and transformed to torque.

As shown in the drawing, the first path 151 is connected to the upper space that corresponds to the upper surface of the first plunger 215 through the connecting rod 110 and the plunger housing 105.

And, the second path 152 is connected to the middle space between the first plunger 215 and the second plunger 220 through the plunger housing 105, and the third path 153 is connected to the lower space that corresponds to the lower surface of the plunger through the plunger housing 105.

Referring to FIG. 2, through the second path 152, hydraulic pressure is supplied between the first plunger 215 and the second plunger 220, and the first plunger 215 is lifted upwardly and the second plunger 220 is lowered downwardly.

Accordingly, the first plunger 215 lifts the piston 100 upwardly through the piston pin 210, and the first state of high compression ratio is performed.

Figure 3:
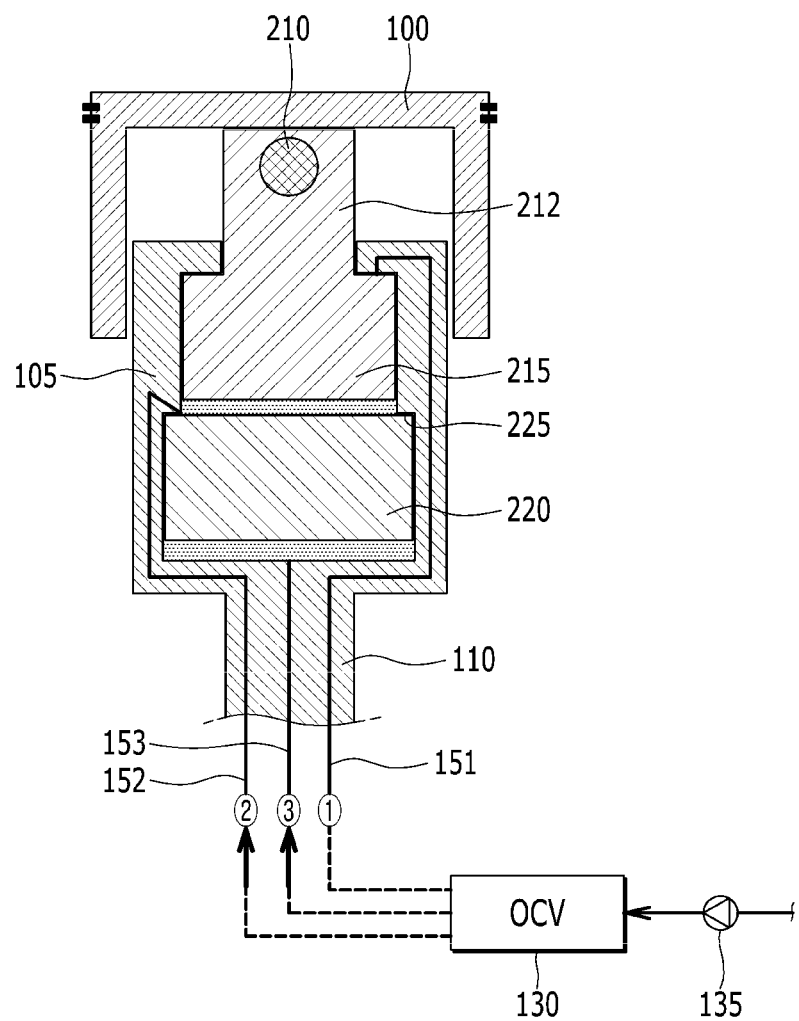
FIG. 3 is a partial cross-sectional view illustrating the state in which hydraulic pressure is supplied to the second path and the third path in a variable compression ratio apparatus according to the present disclosure.

FIG. 3 is a partial cross-sectional view illustrating the state in which hydraulic pressure is supplied to the second path and the third path in a variable compression ratio apparatus.

Referring to FIG. 3, hydraulic pressure is supplied between the first plunger 215 and the second plunger 220 through the second path and the third path, and supplied to the lower space that corresponds to the lower portion of the second plunger 220.

Accordingly, the first plunger 215 is lifted upwardly and the second plunger 220 is also lifted upwardly, and the second state of high compression ratio is performed.

Figure 4:
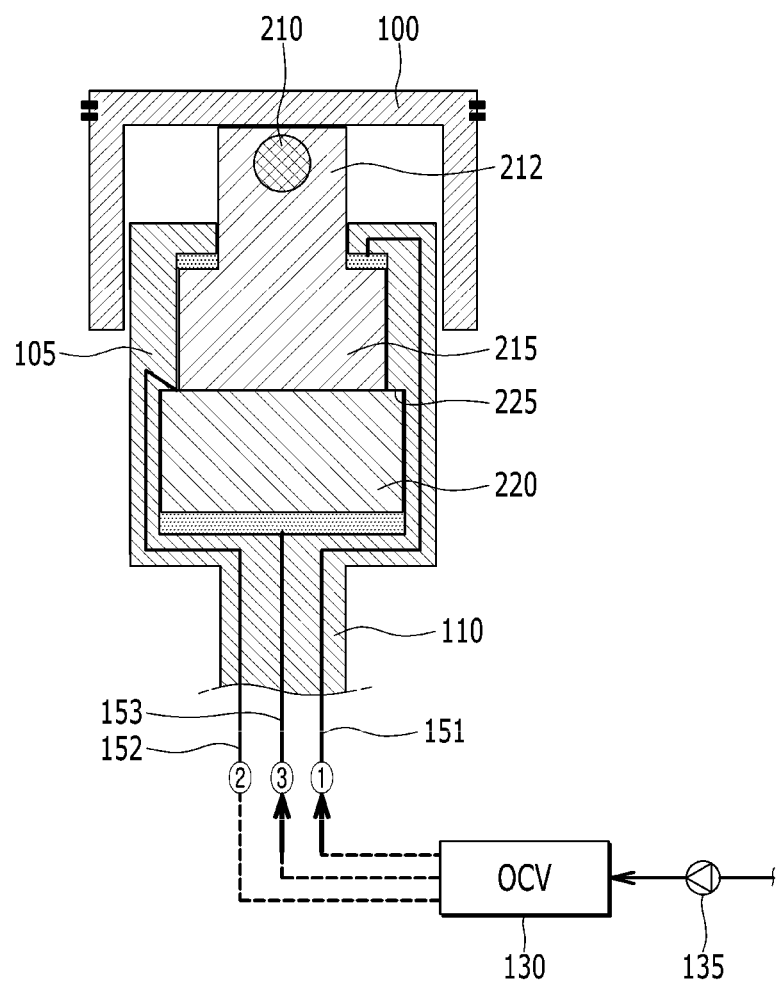
FIG. 4 is a partial cross-sectional view illustrating the state in which hydraulic pressure is supplied to the first path and the third path in a variable compression ratio apparatus according to the present disclosure.

FIG. 4 is a partial cross-sectional view illustrating the state in which hydraulic pressure is supplied to the first path and the third path in a variable compression ratio apparatus.

Referring to FIG. 4, hydraulic pressure is supplied to the upper portion of the first plunger 215 and the lower portion of the second plunger 220 through the third path 153 and the first path 151.

Accordingly, the second plunger 220 is lifted upwardly and the first plunger 215 is lowered downwardly, and the middle compression ratio state is performed by preventing further lowering of the first plunger in the state that the position of the second plunger 220 is fixed by the stopping protrusion 225.

FIG. 5 is a partial cross-sectional view illustrating the state in which hydraulic pressure is supplied to the first path in a variable compression ratio apparatus.

Referring to FIG. 5, hydraulic pressure is supplied to the upper portion of the first plunger 215, and the second plunger 220 and the first plunger 215 are lowered downwardly.

Accordingly, the first plunger 215 lowers the piston 100 downwardly through the piston pin 210 so that the low compression state is performed.

FIG. 6 is a table representing a hydraulic pressure supply state of an oil line according to the high compression ratio, the middle compression ratio and the low compression ratio in a variable compression ratio apparatus.

Referring to FIG. 6, the high compression ratio, the middle compression ratio and the low compression ratio are performed according to the position of the piston 100, and the high compression ratio includes two modes, that is, the first state and the second state.

In the first state of high compression ratio, hydraulic pressure is supplied to the second path 152. However, hydraulic pressure is not supplied to the first path 151 and the third path 153, and released through the return path 140.

In the second state of high compression ratio, hydraulic pressure is supplied to the second path 152 and the third path 153. However, hydraulic pressure is not supplied to the first path 151, and released through the return path 140.

In the middle compression state, hydraulic pressure is supplied to the first path 151 and the third path 153. However, hydraulic pressure is not supplied to the second path 152, and released through the return path 140.

And, in the low compression state, hydraulic pressure is supplied to the first path 151. However, hydraulic pressure is not supplied to the second path 152 and the third path 153, and released through the return path 140.

In the exemplary forms of the present disclosure, the high compression ratio, the middle compression ratio and the low compression ratio may be performed by controlling the hydraulic pressure supplied to the first path 151, the second path 152 and the third path 153 through the hydraulic pressure control valve 130, and by controlling the compression ratio in multistep, the fuel consumption is decreased and the engine power is improved in comparison with a variable compression ratio apparatus of two steps.

Referring FIG. 2 again, although the structure is shown that the first plunger and the second plunger are divided, in another form, the first plunger and the second plunger may be combined into a single plunger, and have an integrated structure.

While the present disclosure has been described in connection with exemplary forms, it is to be understood that the present disclosure is not limited to the disclosed forms. On the contrary, it is intended to cover various modifications and equivalent arrangements by a skilled person in the art included within the spirit and scope of the forms of the present disclosure.

<Description of symbols>

| | |
|---|---|
| 100: piston | 105: plunger housing |
| 110: connecting rod | 115: crank shaft |
| 120: crank pin | 125: balance weight |
| 130: hydraulic pressure control valve | 135: oil pump |
| 140: return path | 151: first path |
| 152: second path | 153: third path |
| 210: piston pin | 212: protrusion |
| 215: first plunger | 220: second plunger |
| 225: stopping protrusion | |

What is claimed is:

1. A variable compression ratio apparatus, comprising:
   a connecting rod having an end connected with a crank pin of a crank shaft;
   a plunger housing formed at an other end of the connecting rod, the plunger housing having a space to which a first plunger and a second plunger are inserted therein, wherein an opening is formed in an upper surface of the plunger housing and arranged in an opposite direction to the crank pin, and the first and second plungers are configured to move upward and downward, wherein an outer circumference surface of the first and second plungers respectively contacts an inner circumference surface of the plunger housing;
a protrusion protruded outwardly from the first plunger through the opening, and connected with a piston by a piston pin; and
a hydraulic pressure control valve configured to supply hydraulic pressure into the space, and configured to move the first and second plungers by supplying the hydraulic pressure to a rear surface of the second plunger and to a front surface of the first plunger,
wherein the first plunger is disposed at a side of the piston independent of the second plunger and has a small diameter than a diameter of the second plunger.

2. The variable compression ratio apparatus of claim 1, wherein
the hydraulic pressure control valve supplies hydraulic pressure between the second plunger and the first plunger.

3. The variable compression ratio apparatus of claim 1, wherein
the connecting rod includes:
a first path providing hydraulic pressure from the hydraulic pressure control valve to the front surface of the first plunger,
a third path providing hydraulic pressure from the hydraulic pressure control valve to the rear surface of the second plunger, and
a second path providing hydraulic pressure from the hydraulic pressure control valve to a portion between the first plunger and the second plunger.

4. The variable compression ratio apparatus of claim 1, wherein
the space of the plunger housing includes:
a large inner diameter portion where the second plunger is disposed, and
a small inner diameter portion where the first plunger is disposed, and
wherein a stopping protrusion is formed between the large inner diameter portion and the small inner diameter portion, so as to stop a movement of the second plunger.

5. The variable compression ratio apparatus of claim 1, wherein
the hydraulic pressure supplied by the hydraulic pressure control valve is supplied to an inside space of the plunger housing through the crank shaft, the crank pin and the connecting rod.

6. The variable compression ratio apparatus of claim 3, wherein
the hydraulic pressure control valve supplies oil only to the second path so as to supply the hydraulic pressure between the first plunger and the second plunger, whereby a high compression ratio being performed by putting a distance between the first plunger and the crank pin.

7. The variable compression ratio apparatus of claim 3, wherein
the hydraulic pressure control valve supplies oil to the second path and the third path such that hydraulic pressure is supplied between the second plunger and the first plunger, and to the rear surface of the second plunger opposite to the first plunger, and
wherein the first plunger becomes apart from the crank pin, whereby implementing a high compression ratio.

8. The variable compression ratio apparatus of claim 3, wherein
the hydraulic pressure control valve supplies oil only to the first path such that hydraulic pressure is supplied to the front surface of the first plunger, and
wherein the first plunger becomes close to the crank pin, whereby implementing a low compression ratio.

9. The variable compression ratio apparatus of claim 3, wherein
the hydraulic pressure control valve supplies oil to the first path and the third path such that hydraulic pressure is supplied to the rear surface of the second plunger opposite to the first plunger, and to the front surface of the first plunger, and
wherein the first plunger is moved downward, and a middle compression ratio is implemented in a state in which the first plunger is supported by the second plunger.

10. A variable compression ratio apparatus, comprising:
a connecting rod having an end connected with a crank pin of a crank shaft;
a plunger housing formed at an other end of the connecting rod, the plunger housing having a space to which a first plunger and a second plunger are inserted therein, wherein an opening is formed in an upper surface of the plunger housing and arranged in an opposite direction to the crank pin, and
wherein the second plunger is disposed in the space independent of the first plunger;
a protrusion protruded outwardly from the first plunger through the opening, and connected with a piston by a piston pin; and
a hydraulic pressure control valve configured to move the first and second plungers by supplying hydraulic pressure to a rear surface of the second plunger and to a front surface of the first plunger.

11. The variable compression ratio apparatus of claim 10, wherein
the hydraulic pressure control valve supplies hydraulic pressure between the second plunger and the first plunger.

12. The variable compression ratio apparatus of claim 11, wherein
the connecting rod includes:
a first path providing hydraulic pressure from the hydraulic pressure control valve to the front surface of the first plunger,
a third path providing hydraulic pressure from the hydraulic pressure control valve to the rear surface of the second plunger, and
a second path providing hydraulic pressure from the hydraulic pressure control valve to a portion between the first plunger and the second plunger.

13. The variable compression ratio apparatus of claim 11, wherein
the space of the plunger housing includes:
a large inner diameter portion where the second plunger is disposed, and
a small inner diameter portion where the first plunger is disposed, and wherein a stopping protrusion is formed between the large inner diameter portion and the small inner diameter portion, so as to stop a movement of the second plunger.

* * * * *